United States Patent [19]
Stapleton

[11] Patent Number: 5,984,155
[45] Date of Patent: Nov. 16, 1999

[54] UTILITY BAR ASSEMBLIES FOR A ROOF RACK

[75] Inventor: Craig A. Stapleton, Clarkston, Mich.

[73] Assignee: SportRack LLC, Sterling Heights, Mich.

[21] Appl. No.: 08/999,443

[22] Filed: Dec. 29, 1997

[51] Int. Cl.⁶ .................................................. B60R 9/045
[52] U.S. Cl. .......................................... 224/321; 224/331
[58] Field of Search .................................. 224/309, 321, 224/322, 329, 330, 331

[56] References Cited

U.S. PATENT DOCUMENTS

| | | | |
|---|---|---|---|
| 3,677,451 | 7/1972 | Burland | 224/322 |
| 4,295,588 | 10/1981 | Kowalski et al. | 224/321 |
| 4,736,878 | 4/1988 | Rasor | 224/321 |
| 4,778,092 | 10/1988 | Grace | 224/322 |
| 5,104,020 | 4/1992 | Arvidsson et al. | 224/322 |
| 5,143,267 | 9/1992 | Cucheran et al. | 224/321 |
| 5,275,320 | 1/1994 | Duemmler | 224/322 |
| 5,419,479 | 5/1995 | Evels et al. | 224/322 |
| 5,492,258 | 2/1996 | Brunner | 224/322 |
| 5,511,708 | 4/1996 | Cronce et al. | 224/321 |
| 5,511,709 | 4/1996 | Fisch | 224/321 |
| 5,531,467 | 7/1996 | Ravier | 224/321 X |
| 5,758,810 | 6/1998 | Stapleton | 224/321 |
| 5,794,826 | 8/1998 | Cronce et al. | 224/321 |

FOREIGN PATENT DOCUMENTS

| | | | |
|---|---|---|---|
| 205414 | 12/1986 | European Pat. Off. | 224/321 |
| 3428154 | 2/1986 | Germany | 224/321 |
| 4320765 A1 | 1/1994 | Germany | 224/329 |
| 405962 | 7/1966 | Switzerland | 224/331 |
| 827054 | 2/1960 | United Kingdom | 224/331 |

Primary Examiner—Gregory M. Vidovich
Attorney, Agent, or Firm—Rader, Fishman & Grauer PLLC

[57] ABSTRACT

A utility bar assembly for attachment to a roof rack, including an elongated utility bar, at least two clamp assemblies detachably engageable with the roof rack, at least two fastening devices for connecting the clamp assemblies to the utility bar. Optional support blocks may also be provided for positioning and supporting the utility bar on the roof rack.

9 Claims, 4 Drawing Sheets 5,984,155

UTILITY BAR ASSEMBLIES FOR A ROOF RACK

FIELD OF THE INVENTION

The present invention relates generally to a utility bar assembly for a vehicle roof rack, and more particularly a structural utility bar assembly capable of carrying heavier loads than the roof rack and further provided with a security fastening device for releasably fastening the utility bar assembly to the roof rack assembly.

BACKGROUND OF THE INVENTION

It is known in the automotive industry to provide roof racks on vehicles for carrying skis, bicycles, and the like. However, such roof racks are not designed for carrying heavy loads and therefore, the users of the roof rack are limited in how many items they may transport on the roof racks.

Presently, there are know utility bar type of assemblies which are attachable to existing roof racks that are provided by the automobile manufacturers. These types of assemblies, however, often have complicated attachment mechanisms which contain numerous components. Thus, these assemblies are very costly and are not easily installed.

Therefore, there exists a need for a utility bar assembly that is economical and easy to install.

SUMMARY OF THE INVENTION

The present invention is directed to a structural utility bar assembly for attachment to a roof rack that has at least two substantially parallel rails, each of which further includes a lip. The utility bar assembly includes an elongated utility bar, at least two clamp assemblies, and at least two fastening devices for connecting the clamp assemblies to the utility bar. The utility bar assembly may further include optional support blocks to insure proper positioning of utility bars on the parallel rails.

The utility bar is generally C-shaped and includes a bottom surface that is connected to side walls. The side walls further include laterally extending tab portions that form a channel on which accessories may be easily loaded. The utility bar preferably is constructed of steel, such that it is capable of carrying heavy loads.

The clamp assemblies include pivoting blocks which are connected to clamps. The clamps include engaging ends and positioning members. The engaging ends are adapted to engage the lips of the parallel rails. The positioning members are adapted to engage detents formed in the parallel rails. The clamp assembly has no moving parts and offers a simple design that can be economically manufactured.

The fastening devices includes security screws which may be tightened or loosened by means of a special wrench. The security screws extend through the utility bar and is threaded into the clamps. As they are tightened, the clamps are raised upward which, in turn, raises the engaging members into tight engagement with the lips. The security screws are the only components which need to be adjusted when installing or uninstalling the utility bar assembly. Thus, the invention provides for easy installation. Further, manufacturing costs are lower as there is only a minimum number of components associated with the utility bar assembly.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
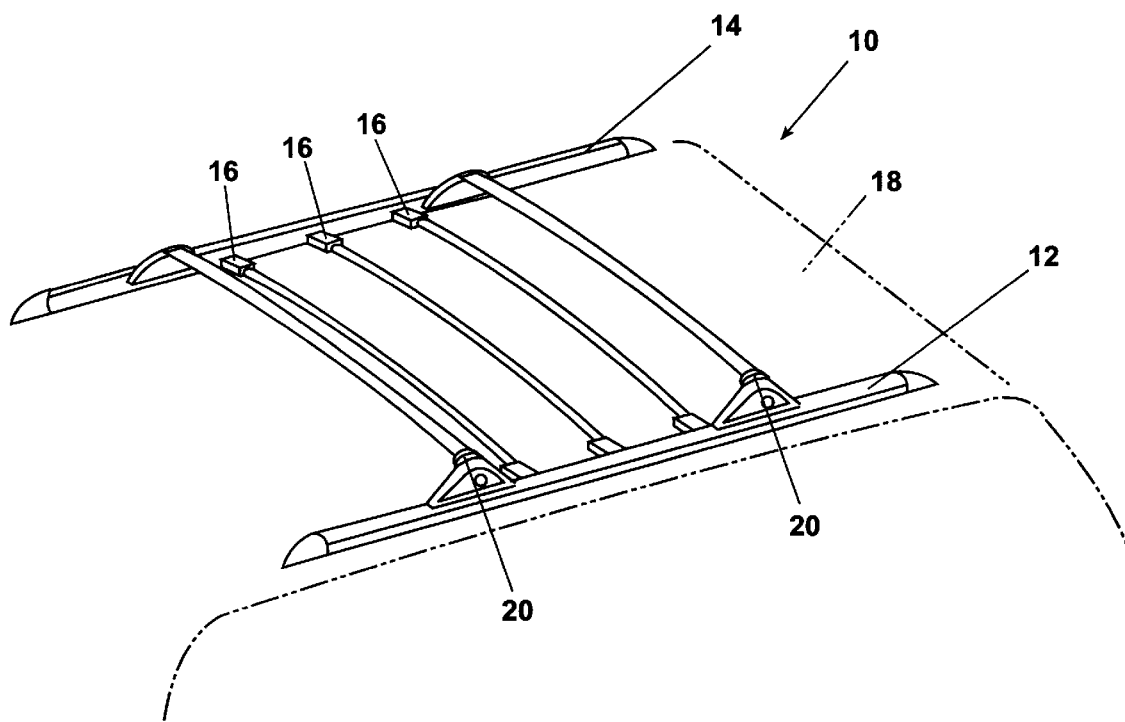
FIG. 1 is a perspective view of the utility bar assembly of the present invention installed on a roof rack on a vehicle.

FIG. 1 shows a roof rack 10 which has crossbar assemblies 20 attached thereon in accordance with the present invention. Roof rack 10 includes side rails 12 and 14, and cross rails 16. Side rails 12 and 14 and cross rails 16 are typically provided by the automobile manufacturer and are present on a vehicle roof 18 at the time of sale. However, it is understood that side rails 12 and 14 and cross rails 16 may be added to vehicle roof 18 as an after market item.

In the application as shown, side rails 12 and 14 are positioned on vehicle roof 18 such that they are substantially parallel to each other and are in continuous contact along vehicle roof 18. Cross rails 16, which are optional, are positioned substantially perpendicular to side rails 12 and 14 and are disposed between them. Both side rails 12 and 14 and cross rails 16 are supported by, and attached to vehicle roof 18. However, in some automotive designs, side rails 12 and 14 are spaced from vehicle roof 18. Utility bar assemblies 20 are equally applicable to either side rail design.

Figure 2:
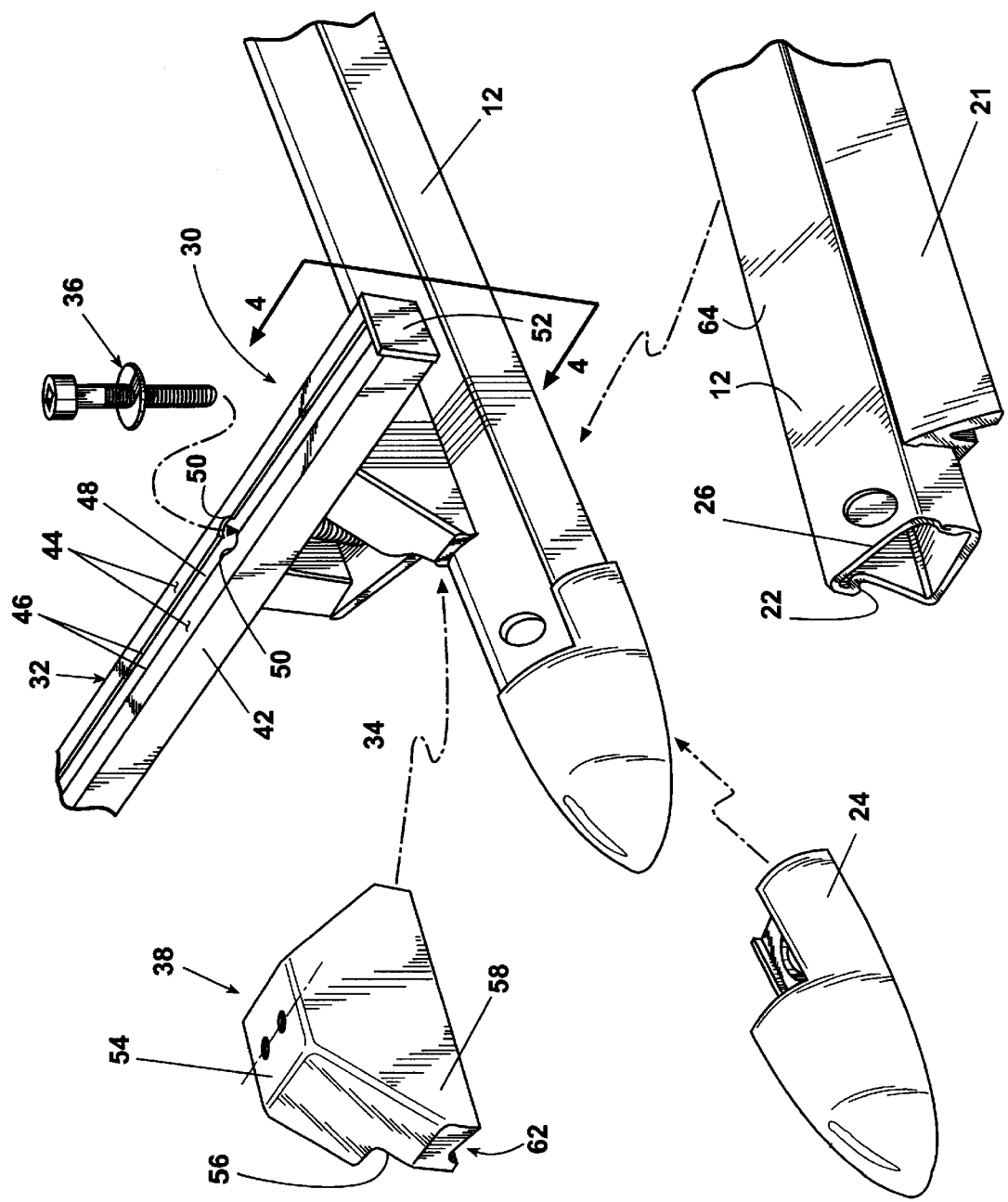
FIG. 2 is a partially exploded view of the utility bar assembly.

Now referring to FIG. 2, utility bar assembly 20 is shown attached to side rail 12. Side rail 12, which is substantially identical to side rail 14, is typically a hollow member which is retained in a bottom member 21. Side rail 12 has a lip 22 which extends substantially along the entire length of side rail 12. An optional rail guard 24 may further be included on an end 26 of side rail 12.

Referring to FIGS. 2–5, utility bar assembly 20 includes an elongated utility bar 32, at least two clamp assemblies 34 (only one shown), and at least two fastening devices 36 (only one shown). In the preferred embodiment, utility bar assembly 20 also includes at least two supporting blocks 38 (only one shown), for additional support of utility bar 32 and to insure proper positioning on side rails 12 and 14.

Utility bar 32 has a generally C-shaped cross-section and is preferably constructed of a roll form section made from steel, such that utility bar 32 is able to carry heavy loads. Utility bar includes a bottom surface 40 that is connected to side walls 42. Side walls 42 preferably further include laterally extending tab portions 44 having spaced away terminal ends 46 that form a channel 48. Channel 48 allows for easy loading and unloading of accessories. Further, fastening device 36 is disposed within channel 48. Terminal ends 46 are further provided with opposing grooves 50, which provide easy access to fastening device 36, to be discussed later in greater detail. Utility bar 32 also includes end caps 52, which serve to reduce access to fastening device 36, thereby making utility bar assembly 30 tamper-resistant.

Figure 4:
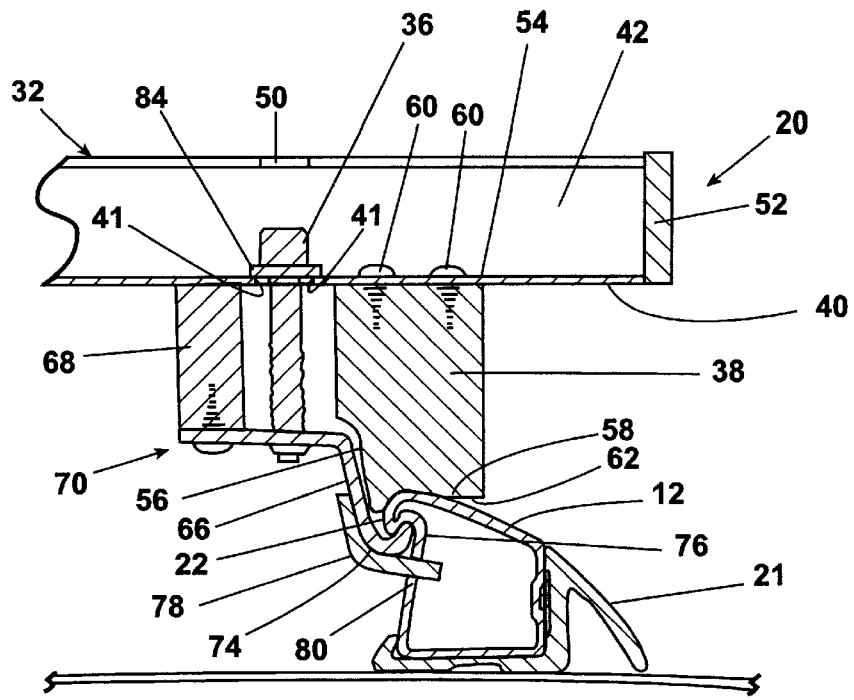
FIG. 4 is a cross-sectional view taken substantially through lines 4—4 of FIG. 2.

Each support block 38 has a top portion 54, an intermediate portion 56 and a bottom portion 58, as seen in FIGS. 2 and 4. Top portion 54 is connected to bottom surface 40 of utility bar 32 by small screws 60 or other suitable fastening devices. Bottom portion 58 has a lower surface 62 which is adapted to engage a top surface 64 of side rail 12 to position utility bar 32 in a substantially perpendicular orientation across side rail 12. Intermediate portion 56 is adapted to engage a web portion 66 of clamp assembly 34, which will be discussed later in greater detail, when clamp assembly 34 is in engagement with side rail 12. Support block 38 is preferably constructed of a thermoplastic material and is extruded into its desired shape, to reduce material and manufacturing costs.

Figure 3:
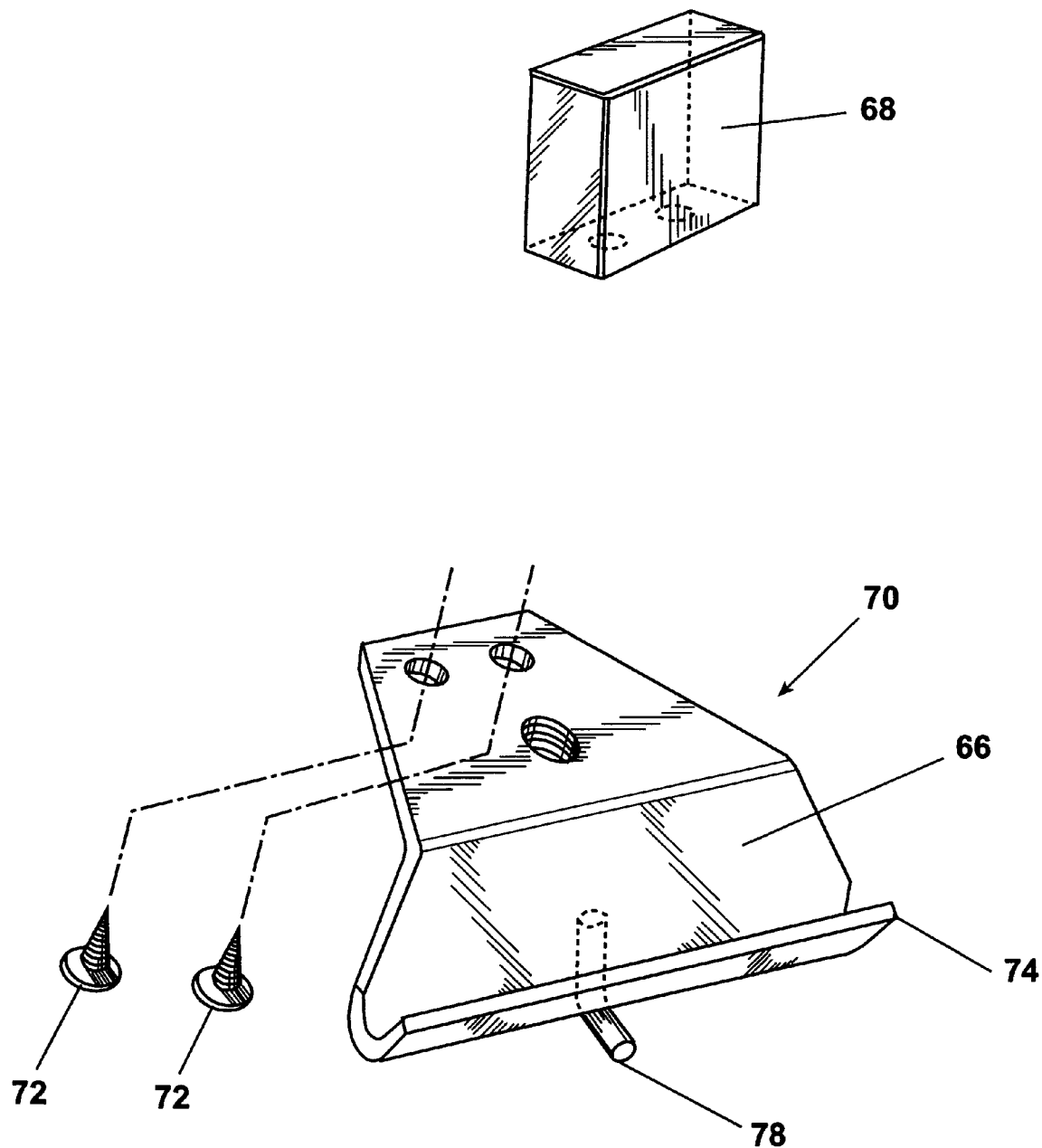
FIG. 3 is an exploded view of a clamp assembly.

Referring to FIGS. 3 and 4, each clamp assembly 34 includes a pivoting block 68 that is connected to a clamp 70. Pivoting block 68 is preferably constructed from molded thermoplastic due to its low cost. Small screws 72 or other suitable fastening devices, serve to connect pivoting block 68 to clamp 70.

Each clamp 70 includes web portion 66 having an arcuate surface 74. Arcuate surface 74 forms an engaging end 76 that is adapted to engage lip 22 of side rail 12. Connected to arcuate surface 74 is an optional positioning member 78. Positioning member 78 is adapted to engage a detent 80 formed in side rail 12 below lip 22. Clamp 70 is preferably a stamped steel component, thereby insuring durability of clamp 70. Positioning member 78, also constructed of steel, is connected to arcuate surface 72 by soldering or other suitable means.

Figure 5:
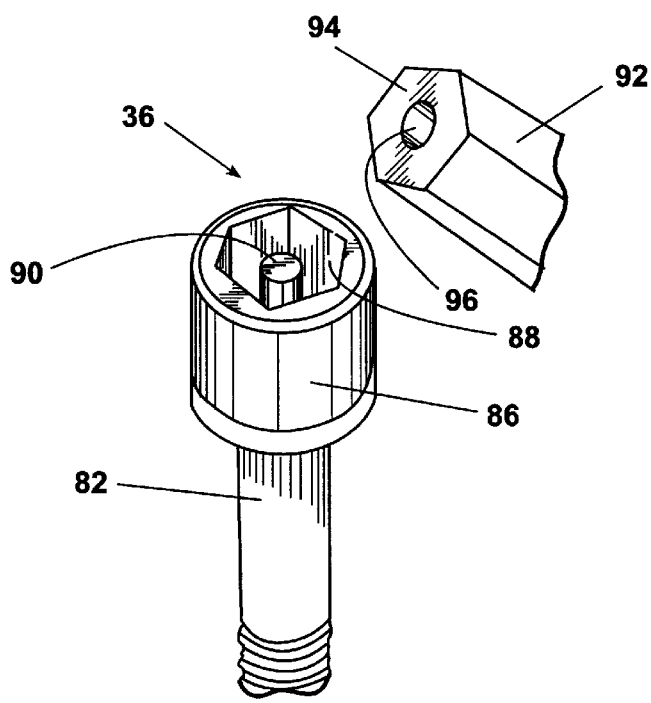
FIG. 5 is a detail of a security screw.

Clamp assemblies 34 are connected to utility bar 32 by fastening devices 36. Each fastening device 36, as best seen in FIGS. 4 and 5, includes a security screw 82 and a washer 84. Security screw 82 is threaded and is adapted to extend through elongated slot 41 of bottom surface 40 of utility bar 32 and engage clamp 70. Security screw 82 further includes a head 86 which has a preferable aperture 88 with a protrusion 90 positioned within it. To engage and disengage security screw 82 from utility bar assembly 20, a special wrench 92 is provided. Wrench 92 has a screw engaging portion 94 adapted to engage with head 86. Screw engaging portion 94 has a shape which substantially corresponds to the shape of aperture 88, and further includes an aperture 96 adapted to receive protrusion 90. Security screw 82 is the only component which needs to be tightened or loosened to install or remove utility bar assembly 20, thereby limiting the number of components needed to install utility bar assembly 20.

Operation of the Present Invention

Now referring to FIGS. 1–5, when it is desired to install utility bar assembly 30 of side rails 12 and 14, support blocks 38 are secured to the utility bar 32 at opposite ends of utility bar 32. Clamp assemblies 34 are loosely assembled to utility bar 32 by fastening devices 36. Utility bar assembly 20 is then placed on side rails 12 and 14 with the lower surface 62 of support blocks 38 engaging top surface 64 of side rails 12 and 14 such that utility bar assembly 20 is generally perpendicular to side rails 12 and 14. The engaging ends 76 of clamp assemblies 34 are then slid under lips 22 of side rails 12 and 14, with the positioning members 78 engaging detents 80 of side rails 12 and 14. The security screws 82 are then tightened with wrench 92, such that washers 84 are secured against the bottom surface 40 of the utility bar 32. When security screws 82 are tightened, pivoting blocks 68 engage the bottom surface 40 of utility bar 32, thereby raising the engaging ends 76 of clamps 70 upward and into tight engagement with lips 22. Web portions 66 of clamp assemblies 34 are in contact with intermediate portions 56 of support blocks 38 when security screws 82 are tightened.

To remove the utility bar assembly, the security screws 82 are loosened with wrench 92, thereby allowing pivoting blocks 68 to pivot and lower clamp assembly 34. The engaging ends 76 may then be slid inboard and away from side rails 12 and 14.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A utility bar assembly for attachment to a roof rack, wherein the roof rack has at least two substantially parallel rails, each rail including a lip, comprising:

an elongated utility bar having a bottom surface connected to side walls;

first and second clamp assemblies detachably engageable with respective lips of the rails, each said clamp assembly including a clamp having an engaging end, a pivoting block respectively associated with each of said first and second clamp assemblies wherein each block engages a portion of its respectively associated clamp;

at least two fastening devices for connecting said clamp assemblies to said utility bar wherein said utility bar has a generally C-shaped cross section, wherein said side walls include laterally extending tab portions having spaced apart terminal ends which form a channel therebetween, said channel extending throughout the length of said utility bar wherein each said fastening device is a screw assembly disposed within said channel of said utility bar such that said screw assembly extends through an elongated slot disposed in said bottom surface to connect said clamp assembly to said utility bar wherein said spaced apart terminal ends of said laterally extending tab portions further include opposing grooves, said opposing grooves being in alignment with said elongated slot, said screw assembly further including a wrench sized to fit within said opposing grooves to selectively lock and unlock said clamp assembly from the rails, and at least two support blocks connected to said utility bar, each support block engageable with a respectively associated rail.

2. The utility bar assembly of claim 1, wherein each said screw assembly includes a screw and washer for selectively locking and unlocking said clamp assemblies to the rails, said screw having an aperture of a pre-determined shape and a protrusion disposed in said aperture.

3. The utility bar assembly of claim 2, wherein said at least two support blocks each have a top portion and a bottom portion, said top portion of each support block connected to said bottom surface of said utility bar, said bottom portion of each support block engageable to a respectively associated rail such that said utility bar is positioned generally perpendicular to the rails.

4. The utility bar assembly of claim 1, wherein each said engaging end of each said clamp assembly includes an arcuate surface that defines a groove, said groove engageable with said lip of the rails.

5. The utility bar assembly of claim 4, wherein each said clamp further includes a positioning member connected to said arcuate surface of each said clamp, said positioning member being engageable with a detent in one of the rails.

6. The utility bar assembly of claim 5, wherein each said clamp assembly further includes a web portion having a first end and a second end, said first end connected to said pivot block, said second end connected to said clamp, said web portion further having an aperture adapted to receive said fastening device.

7. A utility bar assembly for attachment to a roof rack, wherein the roof rack has at least two substantially parallel rails that include a lip, comprising:

an elongated utility bar being of a generally C-shaped cross-section having a bottom surface connected to side walls;

wherein said side walls further include laterally extending tab portions having spaced apart terminal ends which form a channel therebetween, said channel extending along the length of said utility bar;

at least two support blocks, each having a top portion and a bottom portion, said top portion of each support block connected to said bottom surface of said utility bar, said bottom portion of each support block engageable with a respectively associated rail such that said utility bar is positioned generally perpendicular to the rails;

at least two clamp assemblies detachably engageable with the lips of respectively associated rails, wherein each said clamp assembly includes a clamp and a pivoting block;

each said clamp having an arcuate surface which defines a groove which is engageable with the lips of the respectively associated rails; and at least two fastening devices disposed within said channel for selectively connecting a respectively associated clamp assembly to said utility bar wherein said fastening device is a screw assembly positioned in said channel and extending through said bottom surface and connecting to said clamp assembly, said screw assembly including a screw and washer for selectively locking and unlocking said clamp assembly to the rails, said screw having an aperature of a predetermined shape and a protrusion in said aperature.

8. The utility bar assembly of claim 7, wherein said terminal ends of said laterally extending tabs further include at least two sets of opposing grooves.

9. The utility bar assembly of claim 7, wherein said clamp further includes a positioning member connected to said arcuate surface of said clamp, said positioning member being engageable with a detent in one of the rails.

* * * * *